United States Patent [19]

Furuhashi

[11] 3,873,182
[45] Mar. 25, 1975

[54] MAGNIFICATION VARYING DEVICE IN OPTICAL INSTRUMENT CAPABLE OF CHANGING THE SPACING BETWEEN TWO OPTICAL AXES

[75] Inventor: Hidehiko Furuhashi, Yokohama, Japan

[73] Assignee: Nippon Kogaku K.K., Tokyo, Japan

[22] Filed: Aug. 6, 1973

[21] Appl. No.: 385,643

Related U.S. Application Data

[63] Continuation of Ser. No. 206,290, Dec. 9, 1971, abandoned.

[30] Foreign Application Priority Data

Dec. 15, 1970   Japan .............................. 45-124696

[52] U.S. Cl. .................................... 350/39, 350/76
[51] Int. Cl. .............................................. G02b 7/16
[58] Field of Search ........... 350/36, 39, 76, 77, 139; 95/18

[56] References Cited
UNITED STATES PATENTS

| | | | |
|---|---|---|---|
| 409,927 | 8/1889 | Clements ........................... | 350/39 X |
| 2,831,481 | 4/1958 | Radin .................................. | 351/2 X |
| 3,170,024 | 2/1965 | Dowling et al ..................... | 350/76 |
| 3,434,772 | 3/1969 | Fogle ................................. | 350/139 X |

FOREIGN PATENTS OR APPLICATIONS

| | | | |
|---|---|---|---|
| 4,701 | 1904 | United Kingdom .................. | 350/76 |
| 269,445 | 1/1914 | Germany ............................... | 350/76 |
| 335,145 | 1/1903 | France .................................. | 350/76 |

*Primary Examiner*—David H. Rubin
*Attorney, Agent, or Firm*—Fitzpatrick, Cella, Harper & Scinto

[57] ABSTRACT

For use in an optical instrument having two objective optical axes the spacing between which is variable, a magnification varying device includes a pair of members for changing the spacing between the two objective optical axes. A pair of magnification varying members are rotatably mounted on the spacing changing members by means of rotary shafts for successively moving lenses of any desired magnifications into alignment with the two optical axes. A pair of supporting members, each having at least one articulation, are provided so that one end of each of the supporting members are pivotally connected to the rotary shaft of each of the magnification varying members and that the other ends of the supporting members are pivotally connected to an operating member which is rotatably mounted to the body of the device. A pair of rotation transmitting members are supported by the supporting members to transmit rotation of the operating member to the respective magnification varying members.

6 Claims, 4 Drawing Figures

3,873,182

MAGNIFICATION VARYING DEVICE IN OPTICAL INSTRUMENT CAPABLE OF CHANGING THE SPACING BETWEEN TWO OPTICAL AXES

This is a continuation of application Ser. No. 206,290 filed Dec. 9, 1971, now abandoned "Magnification Varying Device in Optical Instrument Capable of Changing the Spacing Between Two Optical Axes."

BACKGROUND OF THE INVENTION

1. Field of the Invention

This invention relates to a magnification varying device for use in an optical instrument of the type having two objective optical axes, the spacing between which is variable.

2. Description of the Prior Art

In a prior optical instrument such as a microscope having two objective optical axes, the spacing between which is variable, the magnification of the objective lenses in alignment with the two optical axes have been varied by interchanging the objective lenses in the body of the microscope each time the microscope is used; or by employing a turret or the like which is individually rotated to successively move the objective lenses of any desired magnifications into alignment with the respective objective optical axes. Each of these methods has not only involved a very onerous operation for varying the magnification of the objective lenses, but also involved the risk of selecting incorrect magnifications for the objective lenses.

SUMMARY OF THE INVENTION

In view of the situations described above, the present invention seeks to enable magnifications of the objective lenses in alignment with the two objective optical axes to be varied simultaneously by a single operating member and also to enable such magnification variation to be effected independently of the operation for changing spacing between the two objective optical axes.

According to the present invention, there is provided, in an optical instrument having two optical axes, the spacing between which is variable, a magnification varying device which comprises a pair of members for changing the spacing between the two objective optical axes, a pair of magnification varying members rotatably mounted on said spacing changing members by means of rotary shafts for successively moving lenses of any desired magnifications into alignment with the two optical axes, a pair of supporting members each having at least one articulation, one end of each said supporting member being pivotally connected to the rotary shaft of each said magnification varying member, the other ends of said supporting members being pivotally connected to an operating member rotatably mounted to the body of said device, and a pair of rotation transmitting members supported by said supporting members for transmitting the rotation of said operating member to said magnification varying members. The rotation transmitting members each may comprise a gear train or a train comprising a combination of chain and sprocket wheels, for example.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENTS

Figure 1:
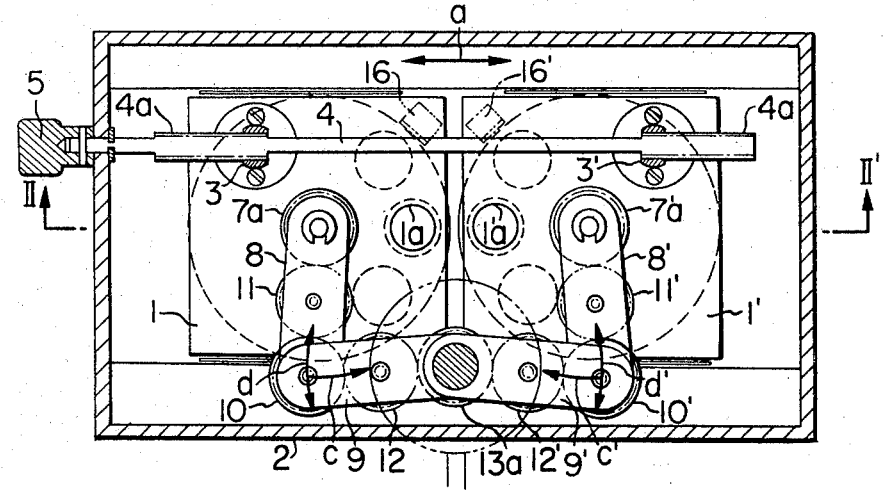
FIG. 1 is a plan view of the device according to an embodiment of the present invention.
Figure 2:
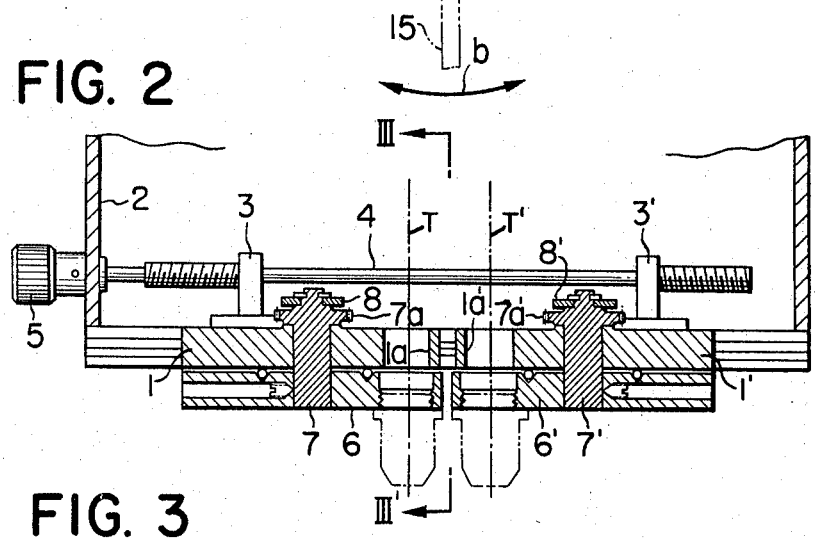
FIG. 2 is a sectional view taken along line II — II of FIG. 1.
Figure 3:
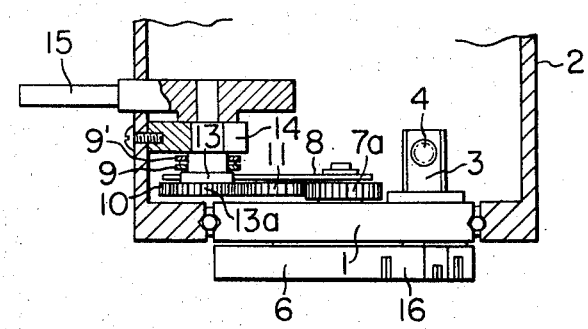
FIG. 3 is a sectional view taken along line III — III of FIG. 2.
Figure 4:
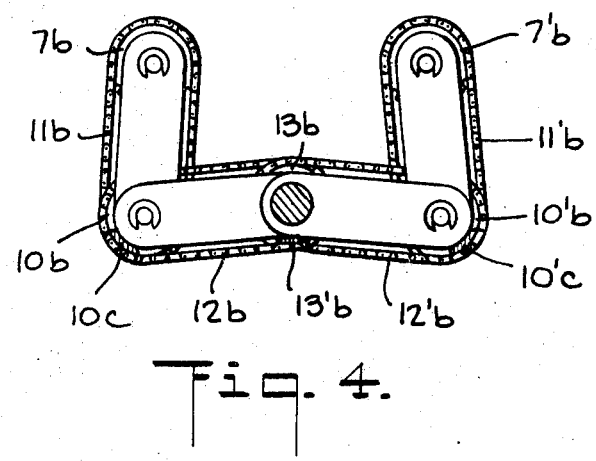
FIG. 4 is a fragmentary plan view showing another form of rotation transmitting members.

Referring to FIGS. 1, 2 and 3, there is shown a form of the present invention embodied in a microscope of the type having two objective optical axes, the spacing between which is variable. A pair of members 1 and 1' for changing the spacing between the objective optical axes are provided with openings 1a and 1a' through which two objective optical axes T and T' (FIG. 2) pass, respectively. The members 1 and 1' are mounted within a microscope body 2 for sliding movement to the right and left, as indicated by a double-headed arrow a. The members 1 and 1' have screw guides 3 and 3' secured thereto for guiding therethrough a threaded adjusting shaft 4 adapted to change the spacing between the objective optical axes T and T'. The shaft 4 has its opposite end portions formed with lefthand and righthand threads 4a, which are in engagement with the respective screw guides 3 and 3'. One end of the shaft 4 is projected outwardly of the microscope body 2 and has an adjusting knob 5 secured thereto.

A pair of magnification varying members 6 and 6' adapted to threadably receive a plurality of objective lenses, are fixed to a pair of rotary shafts 7 and 7' for rotation relative to the members 1 and 1', respectively. The rotary shafts 7 and 7' are rotatably fitted in the respective members 1 and 1' and are formed with gears 7a and 7a', respectively.

Two sets of gear supporting plates 8, 9 and 8', 9' are provided and it will be noted that one end of the gear supporting plate 8 has the rotary shaft 7 journalled therein, and that the other end of the supporting plate 8 is pivotally connected to the shaft of a gear 10, Similarly, one end of the gear supporting plate 8' has the rotary shaft 7' journalled therein, and the other end thereof is pivotally connected to the shaft of a gear 10'. Also, one end of the gear supporting plate 9 is pivotally connected to the shaft of the gear 10, and the other end thereof is pivotally connected to an operating shaft 13, which will later be described in further detail. Likewise, one end of the gear supporting plate 9' is pivotally connected to the shaft of the gear 10', and the other end thereof is pivotally connected to the operating shaft 13 in common with the gear supporting plate 9. These sets of supporting plates 8, 9 and 8', 9' constitute a pair of supporting members articulated at the shafts of gears 10 and 10', respectively. Gears 11 and 11' are interposed between gears 7a and 10 and between gears 7a' and 10', respectively. These gears 11 and 11' are also supported for rotation by the gear supporting plates 8 and 8', respectively. Further, gears 12 and 12' are interposed between the gear 10 and the operating shaft 13 and between the gear 10' and the operating shaft 13, respectively. These gears 12 and 12' are also supported for rotation by the gear supporting plates 9 and 9', respectively.

The operating shaft 13 has a gear 13a formed at one end thereof and, as shown in FIG. 3, the other end of the operating shaft 13 is journalled in a supporting arm 14 fixed to the microscope body 2 and has an operating member 15 secured thereto. The gears 7a, 7a', 10, 10' and 13a have the same number of teeth. The gear trains 13a-12-10-11-7a and 13a-12'-10'-11'-7a' constitute rotation transmitting members for transmitting the rotation of the operating shaft 13 to the magnification varying members 6 and 6', respectively.

Positioning members 16 and 16' are secured to the changing members 1 and 1', respectively, and are adapted to precisely align the objective lenses on the magnification varying members 6 and 6' with the objective optical axes T and T', respectively.

Objective lenses of different magnifications may be mounted on the respective magnification varying members 6 and 6' at their predetermined locations in such a manner that the lenses on the respective members 6 and 6' correspond to each other. To vary the magnification of the objective lenses, the operating member 15 is manually rotated in either of the directions indicated by a double-headed curved arrow bin FIG. 1, so that the magnification varying members 6 and 6' are rotated about the rotary shafts 7 and 7' by means of the gear trans 13a-12-10-117a and 13a-12'-10'-11'-7a' so as to move desired objective lenses into alignment with the respective objective optical axes T and T'.

When the spacing between the optical axes T and T' is to be changed, the adjusting knob 5 is rotated to cause the changing members 1, 1' and the magnification varying members 6, 6' to be moved together in opposite direction by the threaded engagement between the lefthand thread 4a and the screw guide 3 and between the righthand thread 4a and the screw guide 3'. Thereupon, the gear supporting plates 8, 8' are turned about the rotary shafts 7, 7' in the directions of arrows c, c' while the gear supporting plates 9, 9' are turned about the operating shaft 13 in the directions of arrows d, d', thus varying the spacings between the rotary shafts 7, 7' and the operating shaft 13. During that while, the gears 7a, 7a', 10, 10' make no rotation about their axes and are displaced with their associated supporting plates 8, 8', 9, 9' while the gears 12, 12' rotate about their own axes and revolve around the gear 13a. At the same time, the gears 11, 11' rotate about their own axes between the gears 7a, 7a' and the gears 10, 10'. Thus, any change in the spacing between the two objective optical axes T and T' results in no rotation of the magnification varying members 6, 6'.

The embodiment has been illustrated as applied to the objective side of a microscope, but is, of course, applicable to the ocular side for the same effect as described above. Further, the rotation transmitting members have been shown and described as comprising gears 13a-12-10-11-7a and 13a-12'-10'-11'-7a'; however, this is not the only possible form of such transmission but a train comprising a combination of chains 11b and 12b carried by sprocket wheels 13b, 10b, 10c, and 7b and chains 11'b and 12'b carried by sprocket wheels 13'b, 10'b, 10'c and 7'b, or other constructions may be used.

It will thus be appreciated that the present invention enables the magnifications of the objective lenses along the two optical axes to be varied simultaneously by operation of a single operating member independently of the operation of means for varying the spacing between the objective optical axes T and T'. This not only greatly increases the efficiency of operation as compared with the conventional optical instruments of this type, but also totally eliminates the risk of selecting incorrect magnifications of the objective lenses.

I claim:

1. A magnification varying device in an optical instrument having two objective optical axes, the spacing between which is variable, said device comprising:
    a pair of movable members, each having an opening through which an objective optical axis passes, said movable members being movable so that the spacing between said openings is variable on a straight line joining said two objective axes;
    an adjusting member for adjusting the spacing between said openings of said movable members, said adjusting member being mounted on said movable members outside the area of movement of said movable members;
    a pair of magnification varying members mountd for rotation in a plane normal to said optical axes on said movable members for successively moving lenses of any desired magnifications into alignment with said two optical axes;
    a pair of supporting members, each having at least one articulation, one end of each said supporting member being pivotally connected to one of said magnification varying members, the other ends of said supporting members being pivotally connected to a rotatable operating member; and
    a pair of rotation transmitting members supported by said supporting members for transmitting the rotation of said operating member to said magnification varying members.

2. A device according to claim 1, wherein said rotation transmitting members each comprise a gear train.

3. A device according to claim 1, wherein said rotation transmitting members each comprise a chain and sprocket train.

4. A magnification varying device in an optical instrument having two objective optical axes, the spacing between which is variable, said device comprising:
    a pair of movable members, each having an opening through which an objective optical axis passes, said movable members being movable so that the spacing between said openings is variable on a straight line joining said two objective axes;
    an adjusting member for adjusting the spacing between said openings of said movable members, said adjusting member being mounted on said movable members outside the area of movement of said movable members;

a pair of magnification varying members mounted for rotation in a plane normal to said optical axes on said movable members by means of rotary shafts for successively moving lenses of any desired magnifications into alignment with said two optical axes;

a pair of supporting members each having at least one articulation, one end of each said supporting member being pivotally connected to the rotary shaft of each said magnification varying member, the other ends of said supporting members being pivotally connected to an operating member rotatably mounted to the body of said device; and a pair of rotation transmitting members supported by said supporting members for transmitting the rotation of said operating member to said magnification varying members.

5. A device according to claim 4, wherein said rotation transmitting members each comprise a gear train.

6. A device according to claim 4, wherein said rotation transmitting members each comprise a chain and sprocket train.

* * * * *